3,366,631
4-(LOWER ALKYL)-3-METHYL-2-CYCLOALKYL-
MORPHOLINES AND CONGENERS
Max J. Kalm, Skokie, Ill., assignor to G. D. Searle & Co.,
Chicago, Ill., a corporation of Delaware
No Drawing. Filed Apr. 3, 1959, Ser. No. 803,847
9 Claims. (Cl. 260—247)

This invention relates to 3,4-dialkyl-2-cycloalkylmorpholines and congeners, as also to processes whereby these products can be manufactured. More particularly, this invention relates to compounds of the formula

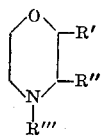

wherein R' and R" represent cycloalkyl and alkyl radicals, respectively, and R''' represents an alkyl or alkenyl radical optionally substituted by 1 or more hydroxy and/or phenyl radicals.

Among the cycloalkyl radicals contemplated by R' in the formula, especially cyclohexyl groupings are preferred, while the alkyl radicals referred to by R" and R''' are most desirably such as methyl, ethyl, propyl, butyl, isobutyl, sec-butyl, tert-butyl, pentyl, isopentyl, tertpentyl, neopentyl, hexyl, isohexyl, heptyl, octyl, and like lower alkyl groupings. The alkenyl radicals comprehended by R''' are also optimally of lower order—for example, vinyl, allyl, butenyl, methylallyl, and similar univalent radicals derived by elimination of a single hydrogen atom from acyclic hydrocarbons containing a double bond. As pointed out above, the alkyl and alkenyl radicals represented by R''' may be modified by the presence of hydroxy or phenyl groupings if desired, in which case hydroxy(lower alkyl) radicals—that is to say lower alkyl radicals wherein 1 hydrogen only is replaced by hydroxyl—and phenylalkyl and phenylalkenyl radicals aggregating not more than 10 carbon atoms appear best adapted to the purposes hereof.

Equivalent to the foregoing basic morpholines for purposes of the present invention are non-toxic acid addition salts thereof, the composition of which is symbolized by

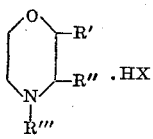

wherein R', R", and R''' have the meanings previously assigned; and X is 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. They are, for example, selective central nervous system depressants—being potent barbiturate potentiators—in addition to which they counteract the edema formation associated with the inflammatory response to tissue insult. Moreover, the subject compounds are antifungal agents, a fact confirmed by their inhibitory effect on the growth of such representative organisms as Trichophyton mentagrophytes.

Manufacture of the compounds of the present invention proceeds by heating together an appropriate morpholine

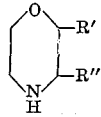

and halide

R'''—Cl in the presence of an acid acceptor such as a tri(lower alkyl)amine or an alkali carbonate, hydroxide, or amide, with a solvent of the type ethanol, butanone, toluene, or formamide as the reaction medium. A catalyst such as sodium iodide may be present if desired. As exceptions to this procedure, the N-methyl compounds hereof are derived from a suitable morpholine

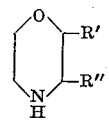

by the action of hot formalin and formic acid; and the corresponding hydroxyethyl compounds are obtained from such morpholine by warming in a closed system with alcoholic ethylene oxide. Spiro compounds of the type reserved by claim 9 hereinafter require substitution of an appropriate dihalide in the general method of manufacture set forth. The meanings of R', R", and R''' throughout the foregoing summarization of preparative procedures remains as before.

Conversion of the amine bases of this invention to corresponding acid addition salts is accomplished by simple admixture of these compounds with 1 equivalent of any of various inorganic and strong organic acids, the anionic portion of which conforms to X as hereinabove defined.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in millimeters of mercury, and relative amounts of materials in parts by weight, except as otherwise noted.

EXAMPLE 1

A. *1 - cyclohexyl-2-(2-hydroxyethylamino)propanol.*— A solution of 39 parts of 2-(2-hydroxyethylamino)-1-phenylpropanol in 160 parts of 95% ethanol is hydrogenated at 60° and pressures of the order of 1000 pounds per square inch, using 5 parts of ruthenium oxide as catalyst. When the uptake of hydrogen indicates that reduction of the phenyl ring is complete, the catalyst is filtered; and the filtrate is stripped of solvent by vacuum distillation. The residue, a yellow oil, solidifies on trituration with ether. The white crystalline solid thus obtained is the desired 1-cyclohexyl-2-(2-hydroxyethylamino)-propanol, M.P. 75.0–77.5°.

B. *2 - cyclohexyl - 3 - methylmorpholine.*—To approximately 18 parts of concentrated sulfuric acid is added, portionwise with agitation at temperatures not to exceed 40°, 10 parts of 1-cyclohexyl-2-(2-hydroxyethylamino)-propanol. The resultant solution is heated to 100° and maintained thereat with agitation for 4½ hours. It is then cooled to room temperatures and allowed to stand overnight. The solution is thereupon cautiously basified with aqueous 25% sodium hydroxide, provision again being made to maintain temperatures below 40°. The resultant mixture is extracted with ether; and the extract, in turn, is dried over anhydrous potassium carbonate and then freed of solvent by evaporation. Distillation of the residue affords 2-cyclohexyl-3-methylmorpholine in the fraction boiling at 70–71° under 0.8 mm. pressure.

C. *2 - cyclohexyl-3,4-dimethylmorpholine hydrochloride.*—A mixture of 14 parts of 2-cyclohexyl-3-methylmorpholine, 7 parts of 36% formalin, and 16 parts of 90% formic acid is heated at the boiling point under reflux with agitation for 6 hours. There is then introduced 12 parts of concentrated hydrochloric acid, whereupon excess formalin and formic acid are distilled off during a further 1½ hour heating period. The residue is taken up in 100 parts of water, and the resultant solution is neutralized with aqueous 25% sodium hydroxide. The mixture thus obtained is extracted with ether, and the ether extract is dried over anhydrous potassium carbonate and then stripped of solvent by evaporation. The residue, a light green oil, is the free base, 2-cyclohexyl-3,4-dimethylmorpholine. Conversion of the base to the corresponding hydrochloric acid salt is accomplished by dissolution of the base in absolute alcohol and mixing therewith sufficient hydrogen chloride dissolved in absolute 2-propanol to produce substantial acidity. The desired 2 - cyclohexyl - 3,4 - dimethylmorpholine hydrochloride is thrown out of solution with anhydrous ether as a white solid, melting at approximately 243.5–244°. The product has the formula

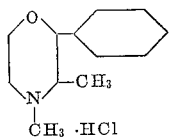

EXAMPLE 2

*2-cyclohexyl - 3 - methyl-4-octylmorpholine hydrochloride.*—A mixture of 110 parts of 2-cyclohexyl-3-methylmorpholine, 116 parts of octyl bromide, 83 parts of anhydrous powdered potassium carbonate, and 9 parts of sodium iodide in 810 parts of butanone is heated at the boiling point under reflux with agitation for 24 hours. The mixture is thereupon cooled, diluted with water (representatively, 1000 parts), an extracted with ether, in that order. The ether extract is dried over anhydrous potassium carbonate and then freed of solvent by evaporation. The residue is the free base, 2-cyclohexyl-3-methyl-4-octylmorpholine, which is converted to the desired salt by suspension in water and addition of excess hydrochloric acid. The salt is isolated by filtration, and purified and dried by trituration with anhydrous ether. 2 - cyclohexyl - 3 - methyl- 4 - octylmorpholine hydrochloride is obtained thus as a white crystalline solid melting in the range, 227.5–232.5°. The product has the formula

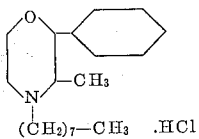

EXAMPLE 3

*2 - cyclohexyl - 4 - (2 - hydroxyethyl) - 3 - methylmorpholine hydrochloride.*—A solution of 18 parts of 2-cyclohexyl-3-methylmorpholine and 9 parts of ethylene oxide in 80 parts of absolute ethanol is maintained in a sealed vessel at 70° for 18 hours. Solvent is then distilled off, leaving as a residue a yellow oil. This oil is 2-cyclohexyl-4-(2-hydroxyethyl)-3-methylmorpholine, which is converted to the corresponding hydrochloric acid salt by dissolution in a small amount of absolute ethanol and mixing therewith sufficient hydrogen chloride dissolved in absolute 2-propanol to produce substantial acidity. The 2-cyclohexyl-4-(2-hydroxyethyl)-3-methylmorpholine hydrochloride which results is thrown out of solution by addition of excess anhydrous ether. The produce is a white crystalline solid, melting at 188–190°. It has the formula

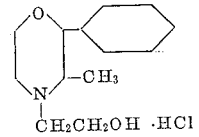

EXAMPLE 4

*2 - cyclohexyl - 4 - (5 - hydroxy - methylpentyl) - 3-methylmorpholine.*—A mixture of 55 parts of 2-cyclohexyl 3-methylmorpholine, 55 parts of 5-chlorohexanol, and 83 parts of anhydrous powdered potassium carbonate in 810 parts of butanone is heated at the boiling point under reflux with agitation for 24 hours. The mixture is thereupon cooled, diluted with 1000 parts of water, and extracted with ether, in that order. The ether extract is dried over anhydrous potassium carbonate and then freed of solvent by evaporation. The residue is suspended in 500 parts of water, and this suspension is made acid with hydrochloric acid. The solution which results is washed with ether to remove neutral impurities and any unreacted starting material. It is then made alkaline with aqueous 25% sodium hydroxide, and the resultant mixture is extracted with ether. Upon drying of the ether extract over anhydrous potassium carbonate and removal of solvent by evaporation, there is obtained as a residue the desired 2-cyclohexyl-4-(5-hydroxy-1-methylpentyl)-3-methylmorpholine. The product has the formula

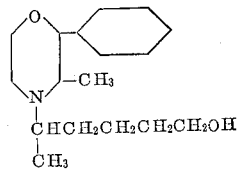

EXAMPLE 5

*4-benzyl-2-cyclohexyl-3-methylmorpholine hydrochloride.*—A mixture of 73 parts of 2-cyclohexyl-3-methylmorpholine, 53 parts of benzyl chloride, and 83 parts of anhydrous powdered potassium carbonate in 640 parts of butanone is heated at the boiling point under reflux with agitation for 24 hours. The mixture is thereupon cooled, diluted with 1000 parts of water, and extracted with ether, in that order. The ether extract is dried over anhydrous potassium carbonate and then freed of solvent by evaporation. The residue is the free base, 4-benzyl-2-cyclohexyl-3-methylmorpholine. Conversion of the base to the corresponding hydrochloric acid salt is accomplished by dissolution of the base in a small amount of absolute ethanol and mixing therewith sufficient hydrogen chloride dissolved in absolute 2-propanol to produce substantial acidity. The 4-benzyl-2-cyclohexyl - 3 - methylmorpholine hydrochloride which results is thrown out of solution by addition of excess anhydrous ether. The product is a white solid melting at approximately 240.5–241.5°. It has the formula

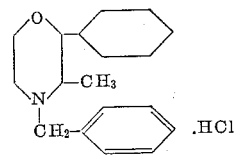

EXAMPLE 6

*2-cyclohexyl-3-methyl-4-phenethylmorpholine.*—A mixture of 110 parts of 2-cyclohexyl-3-methylmorpholine, 97 parts of phenethyl chloride, and 193 parts of anhydrous powdered potassium carbonate in 1600 parts of butanone is heated at the boiling point under reflux with agitation for 24 hours. Work-up in accordance with the procedure of Example 2 affords the free base, 2-cyclohexyl-3-methyl-4-phenethylmorpholine, which has the formula

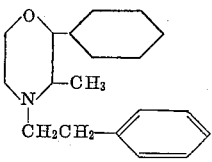

EXAMPLE 7

*4-cinnamyl-2 - cyclohexyl-3-methylmorpholine hydrochloride.*—A mixture of 73 parts of 2-cyclohexyl-3-methylmorpholine, 64 parts of 3-chloropropenylbenzene and 83 parts of anhydrous powdered potassium carbonate in 810 parts of butanone is heated at the boiling point under reflux with agitation for 24 hours. Work-up in accordance with the procedure of Example 5 affords the free base, 4 - cinnamyl - 2 - cyclohexyl - 3 - methylmorpholine, which, taken into absolute ethanol and mixed with an excess of anhydrous 2-propanolic hydrogen chloride as detailed in Example 5, affords 4-cinnamyl-2-cyclohexyl-3 - methylmorpholine hydrochloride. The product is thrown out of solution with anhydrous ether as a white solid melting at approximately 241.5–242:5°. It has the formula

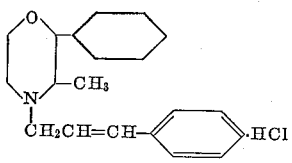

EXAMPLE 8

*2-cyclohexyl - 3 - methyl-spiro[morpholine-4,1'-piperidinium]bromide.*—A mixture of 55 parts of 2-cyclohexyl-3-methylmorpholine, 69 parts of 1,5 - dibromopentane, and 42 parts of anhydrous powdered potassium carbonate in 1170 parts of butanol is heated at the boiling point under reflux with agitation for 18 hours. The mixture is then cooled and filtered, following which addition of anhydrous ether to the filtrate causes precipitation of the desired 2-cyclohexyl-3-methyl-spiro[morpholine-4,1'-piperidinium]bromide. The product is obtained as a white crystalline solid melting at 277–278.5°. It has the formula

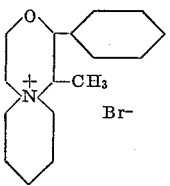

What is claimed is:
1. A compound of the formula

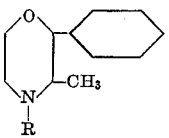

wherein R is selected from the group consisting of radicals the names of which are lower alkyl
hydroxy(lower alkyl)
phenylalkyl
phenylalkenyl the phenylalkyl and phenylalkenyl radicals referred to containing fewer than 10 carbon atoms in each instance.

2. A compound of the formula

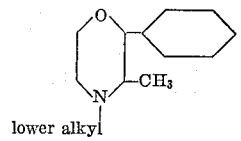

lower alkyl 3. 2-cyclohexyl-3,4-dimethylmorpholine.
4. A compound of the formula

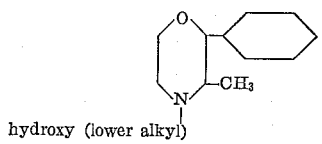

hydroxy (lower alkyl)

5. 2-cyclohexyl-4-(2-hydroxyethyl) - 3-methylmorpholine.
6. A compound of the formula

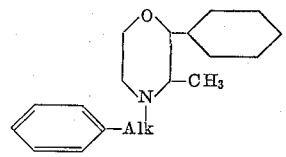

wherein Alk is an alkylene radical comprising fewer than 3 carbon atoms.
7. 4-benzyl-2-cyclohexyl-3-methylmorpholine.
8. 4-cinnamyl-2-cyclohexyl-3-methylmorpholine.
9. 2 - cyclohexyl - 3 - methyl - spiro[morpholine - 4,1'-piperidinium]bromide.

References Cited

UNITED STATES PATENTS

| | | | |
|---|---|---|---|
| 2,777,846 | 1/1957 | Laemmle | 260—247 |
| 2,835,669 | 5/1958 | Thoma | 260—247 |
| 2,828,340 | 3/1958 | Dickinson et al. | 260—563 |
| 2,850,531 | 9/1958 | Weston et al. | 260—563 |
| 3,125,572 | 3/1964 | Siemer et al. | 260—247 |

ALEX MAZEL, *Primary Examiner.*

IRVING MARCUS, H. I. LIDOFF, WALTER A. MODANCE, *Examiners.*

G. ROSEN, J. W. MALASKY, R. PRICE,
*Assistant Examiners.*